(12) United States Patent
Yuan et al.

(10) Patent No.: US 9,007,490 B1
(45) Date of Patent: Apr. 14, 2015

(54) APPROACHES FOR CREATING HIGH QUALITY IMAGES

(71) Applicant: Amazon Technologies, Inc., Reno, NV (US)

(72) Inventors: Chang Yuan, Seattle, WA (US); Richard Howard Suplee, III, Bainbridge Island, WA (US); Daniel Bibireata, Seattle, WA (US); Honghong Peng, San Jose, CA (US); Leo Benedict Baldwin, San Jose, CA (US); Geoffrey Scott Heller, Seattle, WA (US); Wei Li, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 111 days.

(21) Appl. No.: 13/829,147

(22) Filed: Mar. 14, 2013

(51) Int. Cl.
　H04N 5/262　　(2006.01)
　G06F 3/00　　(2006.01)

(52) U.S. Cl.
　CPC ..................... *G06F 3/005* (2013.01)

(58) Field of Classification Search
　USPC ....................... 348/239, 222.1, 241
　See application file for complete search history.

(56) References Cited

U.S. PATENT DOCUMENTS 7,692,700 B2 * 4/2010 Johannesson et al. ........ 348/251
8,385,687 B1 * 2/2013 Blais-Morin ................. 382/294

2008/0094490 A1 * 4/2008 Compton et al. ............. 348/243
2010/0328481 A1 * 12/2010 Shimizu ..................... 348/222.1
2014/0125825 A1 * 5/2014 Baer et al. .................. 348/208.5

OTHER PUBLICATIONS

Kamenicky, Jan et al., "Superfast Superresolution", "Superfast Superresolution," 18th IEEE International Conference on Image Processing, 2011, Šroubek Filip, Kamenický Jan, Peyman Milanfar, 2011, 4 pages.

Park, Sung C. et al., "Super-Resolution Image Reconstruction: A Technical Overview", "Super-Resolution Image Reconstruction: A Technical Overview," IEEE Signal Processing Magazine, May 2003, Park, Sung Cheol; Park, Min Kyu, 2003, 16 pages.

Tsai, Roger Y., "A Versatile Camera Calibration Technique for High-Accuracy 3D Machine Vision Metrology Using Off-the-Shelf TV Cameras and Lenses", "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, Tsai, Roger Y., 1987, 22 pages.

(Continued)

*Primary Examiner* — Sinh Tran
*Assistant Examiner* — Zhenzhen Wu
(74) *Attorney, Agent, or Firm* — Novak Druce Connolly Bove + Quigg LLP

(57) ABSTRACT

Systems and approaches are provided for obtaining high quality image data from lower resolution and/or lower quality image data. An electronic device can be calibrated comprehensively prior to being provided to a user. The calibrated electronic device can be used to capture image data, image metadata, and other sensor data substantially simultaneously. Super-resolution processing can be applied to the captured image data to obtain higher quality image data than the captured image data, such as image data that corresponds to a higher resolution, has less blur, has less noise, has fewer photometric imperfections, and/or has fewer artifacts.

22 Claims, 6 Drawing Sheets

(56) References Cited

OTHER PUBLICATIONS

Yang, Qingxiong et al., "Real-time Specular Highlight Removal Using Bilateral Filtering", http://vision.ai.uiuc.edu/~qyang6/, 2010, 14 pages.

Zhengyou, Zhang, "A Flexible New Technique for Camera Calibration", "A Flexible New Technique for Camera Calibration," IEEE Transactions on Pattern Analysis and Machine Intelligence, Zhengyou Zhang, 22(11): 1330-1334, 2000, 2000, 22 pages.

* cited by examiner

APPROACHES FOR CREATING HIGH QUALITY IMAGES

BACKGROUND

Many personal computing devices, such as smart phones, tablets, laptops, portable media players, e-book readers, and head-mounted displays (HMD) (e.g., eyeglasses, goggles, or helmets) enable digital image data capturing as a key feature. An important characteristic for such portable computing devices is the image quality and resolution capable of being provided by these devices. Indeed, demand for an electronic device incorporating digital imaging functionality can be driven in part by whether the device can provide images having higher fidelity and resolution than other devices. Portable electronic devices typically rely on charge-coupled device (CCD) or CMOS image sensors for digital imaging, and one approach for enabling higher resolution image data is to reduce the size of each pixel of such sensors. However, as the size of each pixel decreases, the amount of light available for the pixel also decreases, which can increase noise and degrade image quality. Another possibility is to increase the size of the chip for the sensor, such as by increasing the size of the pixel array. This approach can result in higher capacitance, which can affect the charge transfer rate of the CCD or CMOS sensor and render the sensor unsuitable for imaging purposes.

BRIEF DESCRIPTION OF THE DRAWINGS

Various embodiments in accordance with the present disclosure will be described with reference to the drawings, in which.

DETAILED DESCRIPTION

Figure 1:
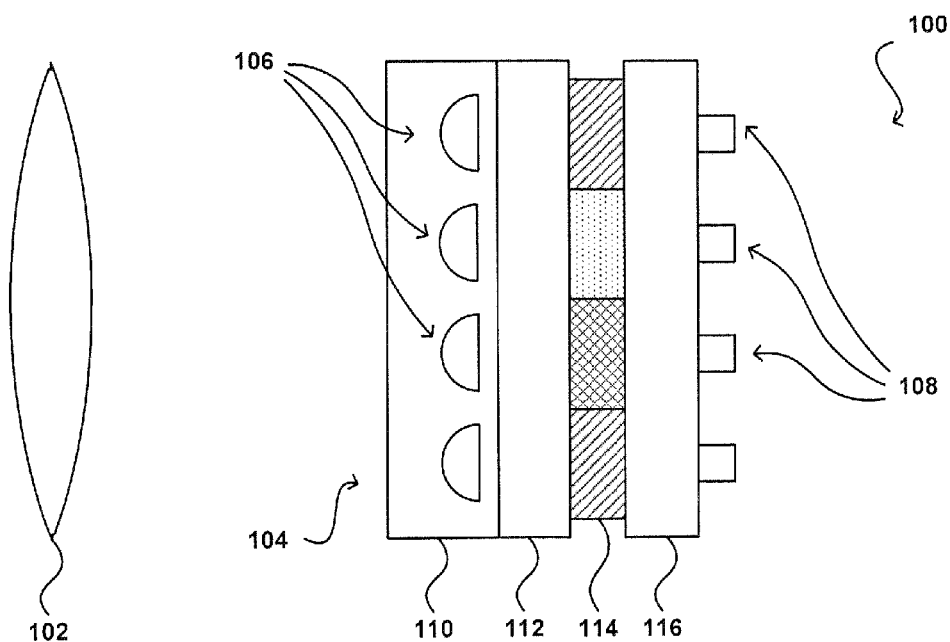
FIG. 1 illustrates an example of components of a camera that can be used in accordance with various embodiments.

Systems and methods in accordance with various embodiments of the present disclosure may overcome one or more of the aforementioned and other deficiencies experienced in conventional approaches for acquiring high quality image data. In particular, various embodiments enable a user to obtain images and/or video that are visually superior (e.g., have a higher fidelity and/or resolution) to the original images and/or video captured by an electronic device. Thus, users are not necessarily constrained by the limitations of their image sensors yet can take advantage of improvements to image sensors to obtain even higher quality and higher resolution image data. Various embodiments provide for comprehensive calibration of the electronic device. A user may then capture image data using the calibrated electronic device and obtain post-processed image data, in substantially real time, that is higher quality than the captured image data. For example, the post-processed image data may correspond to a higher image resolution, have less blurring, have less noise, have fewer photometric imperfections, and/or have fewer artifacts than the captured image data. This can be achieved in accordance with various embodiments by applying a super-resolution algorithm using the captured image data and the calibration profile for the electronic device.

In various embodiments, calibrating the electronic device can occur off-line, such as after the electronic device has been assembled. Other embodiments enable a user to periodically update the calibration profile of an electronic device, such as when an image sensor becomes defective over time and requires recalibration. Calibration may include processes for determining characteristics of device components and/or correcting for manufacturing tolerances or flaws of the components of a camera of the device, such as the lens(es) and/or image sensor(s), and other sensors, such as accelerometers, gyroscopes, digital compasses, etc. For example, camera calibration in various embodiments may include geometric calibration, radiometric or photometric calibration, and measurements for noise, lens imperfections, and other calibration measurements. In various embodiments, calibration of the electronic device can also include estimating the stability and sensitivity of other sensors of the device or determining the relative positions and orientations of the camera with respect to the other sensors. In some embodiments, the calibration profile can be stored in memory on the electronic device. In addition, or alternatively, the calibrate profile can be stored at one or more remote data storage servers.

In various embodiments, an electronic device can be used to acquire image data having a particular level of quality and/or image data at a particular resolution. In some embodiments, image data is captured at the highest resolution of the camera in raw file format. In other embodiments, image data can be captured while the camera is operated in bin mode (e.g., 2×2 bin mode or 3×3 bin mode), which can result in lower resolution image data but less noise. Image metadata, such as camera settings (e.g., aperture, ISO, shutter speed, optical zoom setting, etc.) and other sensor data (e.g., linear velocity, angular velocity, temperature, etc.), can also be captured contemporaneously with the image data. The captured image data, image metadata, and other sensor data can then be stored in memory on the electronic device. In some embodiments, the image data, metadata, and other sensor data can also be sent to a remote server system, such as a server system associated with the remote data storage server(s) used to store the calibration profile for the electronic device. In some embodiments, image data can be captured using a single camera, such as, for example, if the camera is operated in burst mode, with zero shutter lag (ZSL), or in video capture mode. In other embodiments, multiple cameras on a single electronic device can be used to capture the image data. In still other embodiments, multiple cameras on multiple electronic devices may be employed to capture image data.

In various embodiments, the captured image data and metadata can be processed using a super-resolution algorithm to generate enhanced image data having less noise and/or a higher resolution than the original captured image data. Super-resolution may refer to a class of signal processing techniques that can be used to enhance image data, such as by obtaining a higher resolution image (or video) from multiple lower resolution images (or video) and/or to obtain a higher fidelity image (or video) from multiple lower fidelity images (or video). In general, a higher fidelity image can refer to an image that more accurately represents an object or scene as compared to a lower fidelity image of the same object or scene. A higher fidelity image can also be thought of as an image comprising a higher "pixel-to-noise" ratio as compared to a lower fidelity image, wherein the "pixel" of the "pixel-to-noise" ratio corresponds to an actual point in an object or scene. For example, a lower fidelity image may have more blur, noise, radiometric imperfections, artifacts, distortions, or other blemishes than a higher fidelity image. Super-resolution techniques can generally be divided into two main classes, those based on the spatial domain and those based on the frequency domain. An example of an approach for super-resolution in the spatial domain is the interpolation of non-uniformly spaced samples. Captured image data can be registered, resulting in a composite image including samples on a non-uniformly spaced sampling grid. These non-uniformly spaced samples are interpolated and resampled onto a higher resolution sampling grid. The higher-resolution image can be iteratively deconvolved to remove blurring, noise, imperfections, distortions, artifacts, etc. In other embodiments, super-resolution methods operating in the frequency domain can be employed. Frequency domain methods are based on the shifting property of the Fourier transform and the aliasing relationship between the continuous Fourier transform and the discrete Fourier transform. These properties are used to recover a band-limited image from a set of under-sampled (and aliased) observation images. In particular, the shift and aliasing properties can be used to derive a system of equations relating the aliased discrete Fourier transform coefficients of the observed images to samples of the continuous Fourier transform of the unknown original scene. The system of equations can be solved for the frequency domain coefficients, which can then be used to reconstruct the original scene using the inverse discrete Fourier transform. In some embodiments, super-resolution processing can occur on the electronic device. In other embodiments, super-resolution processing can occur at a remote server system, such as a server system used to store captured image data and metadata and the calibration profile for the electronic device.

Various other functions and advantages are described and suggested below in accordance with the various embodiments.

FIG. 1 illustrates an example of components of a camera 100 that can be used in accordance with various embodiments. The camera 100 can operate by allowing light to pass through a shutter (not shown) to an optics system 102 to create an image of a scene. The light is focused onto an image sensor 104 where, depending upon the manufacturing process, a certain percentage of the photons is captured and converted to electric charge. The charge is then amplified, sampled, and processed for output. In this example, the camera includes a matrix of microlenses 106 to increase the amount of light incident to each of a matrix of pixels 108, a microlens overcoat 110, and a microlens spacer 112. The camera 100 may also include a color filter array (CFA) 114 comprising a matrix of alternating colors (e.g., red, green, and blue) that corresponds to each of the pixels of the sensor and a color filter planarization layer 116. As a result of variations in the manufacturing process, discrepancies can arise from one camera to another. For example, there may be differences between the image sensors, lenses and microlenses, arrangement of the lenses and microlenses with respect to the image sensors, etc. In addition, within the camera itself, there can be differences between one pixel of the image sensor of the camera to another. While a camera that is fabricated according to specified manufacturing tolerances may be suitable for conventional purposes, improved image quality and resolution can be obtained from image data captured by a camera with more comprehensive calibration data.

Figure 2:
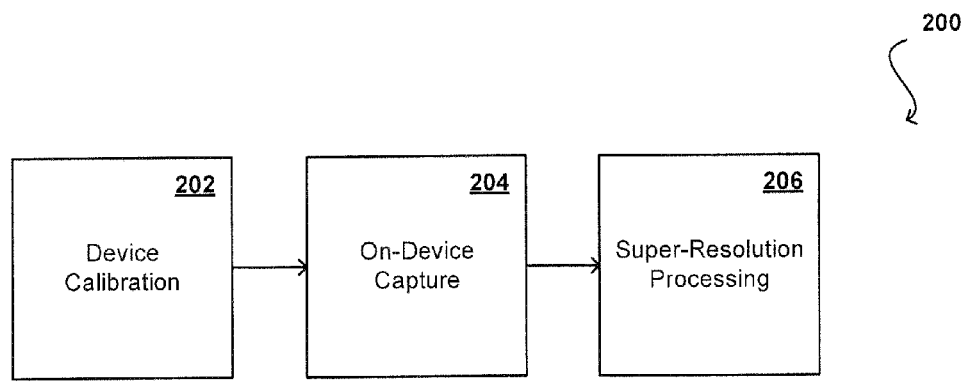
FIG. 2 illustrates an example of a workflow for obtaining high-quality image data in accordance with various embodiments.

FIG. 2 illustrates a high-level overview 200 of an example workflow for obtaining higher quality image data in accordance with various embodiments. The image workflow 200 can include device calibration 202, on-device image data capture 204, and super-resolution processing 206. In at least some embodiments, data generated during device calibration 202 and on-device capture 204 can be sent at various times to a remote server system for super-resolution processing 206. In other embodiments, device calibration data can be stored into the memory of an electronic device and super-resolution processing can occur on the electronic device without the involvement of a remote server system. In addition, it will be appreciated that the stages of the image data workflow 200 are not necessarily sequential. For example, the electronic device can be recalibrated to generate updated device calibration data in between on-device image data capture and super-resolution processing in certain embodiments.

The first stage of the image data workflow 200 comprises device calibration 202. As used herein, a "calibration profile" shall refer to the measurements obtained from the geometric calibration, radiometric or photometric calibration, noise, lens blur, and other calibration data of the camera(s) of an electronic device and measurements obtained from the calibration of the other sensors of the electronic device, such as a digital compass, accelerometer, gyroscope, depth or proximity sensor, GPS, thermometer, altimeter, barometer, etc. Certain conventional approaches to device calibration may only acquire a limited set of the characteristics of the sensors of an electronic device, such as the focal length, principal point (center), pixel size, and distortion coefficients of a camera. Such approaches may neglect other factors, such as noise and/or photo response non-uniformity, that can significantly affect image quality. Conventional calibration measurements are also sometimes only obtained once for a particular camera configuration, and these values are assumed for all cameras using the same configuration. This can fail to take into account manufacturing tolerances or particularized variances between image sensors. Other conventional approaches to device calibration require the user to "self-calibrate" the camera(s) of the electronic device. Such techniques may involve using an over-simplified model to estimate the characteristics of the electronic device, which can result in calibration data that may not be as accurate as desirable for purposes of super-resolution processing. In addition, the typical user may not have the appropriate tools for calibration, such as a multi-collimator, goniometer, flat field light source, etc., or the time and knowledge to properly calibrate an electronic device.

In some embodiments, an electronic device can be calibrated "in factory" or before a user purchases or acquires the electronic device. In certain embodiments, a custom calibration profile can be generated that is specific to a particular electronic device. In other embodiments, a calibration profile can be generated for a set of electronic devices with substantially similar configurations and manufactured at approximately the same time and in the same location. Various characteristics of the electronic device can be obtained during the calibration process, such as estimations for noise, radiometric or photometric imperfections, geometric distortions, lens blur, and other parameters related to image capturing. For example, image sensors can be subject to a variety of noise, including dark-current shot noise, photon shot noise, fixed pattern noise, bias noise, quantization noise, etc. These effects can differ from sensor to sensor as well as from pixel to pixel in the same sensor. In accordance with various embodiments, an electronic device can be calibrated to measure the data associated with each of these conditions. For instance, bias is an offset can occur when a pixel is read from an image sensor of an electronic device. A camera can be calibrated to eliminate (or at least substantially reduce) bias noise by subtracting "a bias noise compensation image" from an image captured at a particular exposure setting. A bias noise compensation image can be generated for each exposure setting of a camera by taking the average or the median of a series of zero-length exposures (or as close as possible to zero length) with the shutter closed for the corresponding exposure setting.

Dark noise can be the result of the gradual accumulation of dark current in the pixels of a sensor during an exposure. The accumulation of dark current is related to the temperature of the image sensor. For example, an increase in temperature of six to ten degrees Celsius can double the amount of dark noise for certain image sensors. Dark current can accumulate at a different rate in every pixel of a sensor, and a camera can be calibrated to compensate for dark noise in various ways. One approach is to generate a "dark noise compensation image" corresponding to the same exposure time and temperature as a captured image, with the shutter closed. Alternatively, a "master dark noise compensation image," comprising the average or median of several dark noise compensation images, such as 10 to 20 dark noise compensation images, under the same exposure time and temperature as the captured image can be used in this approach. Another technique for dark noise calibration is to generate "scaled dark noise compensation images" prior to image capturing. Scaled dark noise compensation images comprise master dark noise compensation images obtained at a set of specified temperatures for a set of exposure settings. Master dark noise compensation images, using this technique, can be created by subtracting a bias noise compensation image from each dark noise compensation image and taking the average or median of the dark noise compensation images. Bias noise compensation images can be applied to the captured image data, and the master dark noise compensation image corresponding to a specified temperature and exposure setting can be applied to scale the master dark noise compensation image to the time of the captured image.

In some embodiments, an electronic device can include a temperature sensor. The temperature sensor can be configured to measure the temperature of the image sensor, or the temperature of the image sensor may be estimated according to a reading of the temperature sensor. The actual or estimated temperature of the image sensor can be used to provide more accurate data for eliminating or reducing dark noise.

In various embodiments, device calibration can include radiometric or photometric calibration to compensate for phenomena such as photo (or pixel) response non-uniformity (PRNU), vignetting, and other conditions caused by variances between pixels and defective pixels. These phenomena can be caused by non-uniform sizes of the pixels, non-uniform thickness of the oxygen in the silicon, increased leakage current, and other variations or flaws of the manufacturing process. In addition, dust on the image sensor can also cast shadows called "dust donuts," which can affect image quality. Image sensors can also be susceptible to vignetting, which is the reduction of brightness or saturation at the periphery of the image sensor, and can be caused by light incident on the sensor at a right angle producing a stronger signal than light hitting the sensor at an oblique angle. One approach for correcting PRNU, vignetting, and other pixel variances (e.g., "hot pixels" or "cold pixels") can be to use "brightness compensation maps." Brightness compensation maps comprise a pixel-by-pixel map of an image sensor's sensitivity to light. Brightness compensation maps can be generated by illuminating the optical system using a uniform light, and taking an exposure when the image sensor is saturated up to a determined saturation level, such as 30% to 50% of the full saturation level of the image sensor. A device such as a diffuser or integrating sphere can be used to generate the uniform light. The brightness compensation map is then renormalized by dividing each pixel into the average value in the image sensor. For example, a pixel that is more sensitive can be assigned a weight slightly below 1.0 and a pixel that is less sensitive can be assigned a weight slightly above 1.0. A brightness compensation map can be applied to a captured image by multiplying the brightness compensation map to the captured image after subtracting a bias noise compensation image and a scaled dark noise compensation image (or a dark noise compensation image alone) from the brightness compensation map. For higher signal-to-noise ratios, a master brightness compensation map can be created by taking the average or median of a set of brightness compensation maps, such as 10 to 20 brightness compensation maps. In some embodiments, certain pixels of the sensor may be determined to be defective based on the pixel's sensitivity being outside of specified thresholds. A defective pixel mask can be used to replace the data of a defective pixel with the average of nearest neighboring pixels.

In some embodiments, the camera(s) can be calibrated to compensate for optical or geometric distortions, which can sometimes be referred to as "geometric calibration" or "resectioning." Lenses used in conventional cameras can be subject to various types of distortion such as radial distortion (e.g., barrel distortion or pin-cushion distortion), tangential distortion, scale error, projection distortion, skew, etc. These types of optical or geometric distortions can be corrected by determining the intrinsic or internal parameters (e.g., focal length, principal point, pixel size, distortion coefficients) and extrinsic or external parameters (e.g., rotation, translation) of the camera. Various approaches can be used to derive a camera's intrinsic and extrinsic parameters, such as direct linear transformation (DLT), the algorithm set forth in Tsai, Roger. "A versatile camera calibration technique for high-accuracy 3D machine vision metrology using off-the-shelf TV cameras and lenses." *Robotics and Automation, IEEE Journal of* 3, no. 4 (1987): 323-344, and the algorithm set forth in Zhang, Zhengyou. "A flexible new technique for camera calibration." *Pattern Analysis and Machine Intelligence, IEEE Transactions on* 22, no. 11 (2000): 1330-1334.

In addition to geometric distortions caused by fabrication of a lens, captured image data can also be subject to blurring as a result of aberrations in the lens, misalignment of the lens with respect to the image sensor, or imprecision of the focus measure of the lens. Blurring can be characterized as a point spread function (PSF) of the camera. In particular, the PSF can provide a metric for determining the degree to which a point in an original scene is blurred in a captured image. Various approaches can be used to determine the PSF of a camera, such as by utilizing wavefront analysis with an interferometer using a laser source as a monochromatic light source, a back-illuminated pinhole or knife-edge, or white noise. In techniques using a knife-edge, an edge spread function can be estimated by imaging a knife-edge. A derivation of the resulting image can provide the one-dimensional line spread function in one particular direction. By rotating the knife-edge, a derivation of the two-dimensional PSF can be estimated. Techniques based on white noise use an image of white noise (e.g., noise with equal power at each spatial frequency) to measure the modulation transfer function (MTF), which is the frequency domain representation of the PSF.

In various embodiments, device calibration can include determining characteristics of other sensors of the electronic device, such as a digital compass, accelerometer, gyroscope, magnetometer, depth or proximity sensor, light sensor, motion detector, microphone, UPS, geolocation sensor, touch sensor, temperature sensor, altimeter, barometer, etc. using similar approaches discussed herein or known in the art. For example, with respect to inertial sensors such as a digital compass, accelerometer, or gyroscope, the sensitivity and stability of such sensors can be obtained using a mechanical platform that turns the electronic device into different precisely controlled orientations and at known rotational velocities. At each orientation and during the rotations the output of the inertial sensors are observed and compared with the pre-calculated gravity force and rotational velocity, respectively. Less rigorous approaches can also be implemented in other embodiments, such as by manually moving the electronic device according to a predetermined motion pattern and comparing the measured motion to ground-truth motion. Likewise, if a device includes a temperature sensor that does not specifically measure the temperature of the image sensor, the temperature sensor can be calibrated to more accurately estimate the temperature of the image sensor by determining differences between the readings provided by the temperature sensor under certain use conditions of the camera and actual temperatures of the image sensor.

A second phase for acquiring high-fidelity and high-resolution image data in accordance with various embodiments comprises on-device image capture 204. During this process, an electronic device that is associated with a comprehensive calibration profile generated, as discussed herein, can be used to capture image data. The captured image data comprises at least one image, but preferably, multiple images are acquired at this stage. The captured image data can be acquired using a single camera (e.g., burst mode, zero shutter lag (ZSL), video capture mode, etc.), multiple cameras on a single electronic device, or multiple cameras on multiple electronic devices in various embodiments. In certain embodiments, the captured image data may be pre-processed as a raw file at a particular resolution, such as the highest resolution capable of being captured by the camera of the electronic device. In other embodiments, the captured image data may comprise a coarser resolution, such as if the camera is operated in bin mode (e.g., 2×2, 3×3). Image metadata, such as camera settings (e.g., exposure settings, focus metric, etc.) and other sensor data (e.g., inertial sensor readings) that are acquired contemporaneously with the captured image data, can also be obtained and be associated with the captured image data.

Systems and approaches in accordance with various embodiments also include super-resolution processing 206. Super-resolution processing can include sub-processes such as image registration, interpolation, and restoration. Image registration can refer to the process of transforming two or more images associated with a common subject matter, such as a same object or a same scene, to correspond to a single coordinate system. The process of registering the images can include detecting and extracting features, matching features between images, and estimating transformation models providing for a mapping of each point in one image to a point in the second image. In some embodiments, image registration of captured image data can occur sequentially with each image of the captured image data registered one by one to incrementally build the registered image data set. In other embodiments, a bundle adjustment can be implemented to align all of the captured image data at once using a least-squares framework to correctly distribute any mis-registration errors. During feature detection, feature matching, and transformation model estimation, one image (or the registered image data set) serves as a "reference" image and another image serves as the "sensed" image. Feature detection and extraction pertains to determining salient features of the reference image and the sensed image. Features can be sets of pixels of interest within an image, and may include points (e.g., line intersections, high variance points, local curvature discontinuities detected using Gabor wavelets, inflection points of curves, local extrema of wavelet transforms, or corners detected using Harris corner detection or Smallest Univalue Segment Assimilating Nucleus (SUSAN) corner detection), edges (detected using, e.g., Canny edge detection, Shen-Castan (ISEF) edge detection), or regions of interest (detected, using, e.g., LaPlacian of Gaussian pyramids or Difference of Gaussian pyramids). In various embodiments, the custom calibration profile of an electronic device can be used to improve the accuracy and speed of feature detection and extraction. For example, the custom calibration profile can be used to filter out certain features of the reference image and sensed image that are not actual features of the images. As discussed herein, noise in an image, such as from "hot pixels" or "dust donuts," can result in false positive determinations of features of an image. In at least some embodiments, defective pixels defined in a defective pixel map, "hot pixels" defined in a brightness compensation map, fixed pattern noise defined in noise compensation images, or other such data from the calibration profile can be assumed to be false positive features and can be removed during the feature detection and extraction process. In this manner, detection and extraction of can result in less processing since the feature space may be reduced.

After detecting and extracting the features, features of the sensed image are matched to features of the reference image to determine correspondences between the sensed image and the reference image. Once the features for an image have been extracted and defined, various feature matching methods can be used to assess the similarity between images. Similarity (or distance) measures will depend on the feature descriptors selected for extraction from an image. Two similarity measures that can be used include the Minkowski distance or the Mahalanobis distance. The Minkowski distance may be appropriate where feature vectors are independent and each feature vector is of equal importance. For example, if D(I, J) is denoted as the distance between a captured image I and a database image J and $f_i(I)$ is the number of features in a bin i of I, the Minkowski distance is defined as:

$$D(I, J) = \left( \sum_i |f_i(I) - f_i(J)|^p \right)^{1/p} \quad \text{(Eqn. 1)}$$

where p=1, 2, and ∞, D(I, J) is the $L_1$ distance (also sometimes called the Manhattan distance), $L_2$ distance (also known as the Euclidean distance), and $L_\infty$ (also called the Chebyshev distance), respectively.

The Mahalanobis distance may be appropriate when each dimension of the feature vector is dependent of each other and is of different importance. The Mahalanobis distance is defined as:

$$D(I, J) = \sqrt{(F_I - F_J)^T C^{-1} (F_I - F_J)} \quad \text{(Eqn. 2)}$$

where C is the covariance matrix of the feature vectors, $F_I$ and $F_J$ are vectors that list all the entries in $f_i(I)$ and $f_i(J)$.

Other similarity measures that can also be used include the Quadratic Form distance, the Kullback-Leibler divergence, the Jeffrey divergence, the Hausdorff distance, the Mallows distance, the earth mover's distance, the integrated region matching distance, or variations thereof. Certain embodiments may also use various indexing structures or techniques for efficiently searching the feature set space, including multi-dimensional hashing, which maps features into fix-sized bins or buckets based on some function applied to each feature; locality sensitive hashing, which uses unions of independently computed hashing functions to index features; multi-dimensional search trees such as k-d trees, which divide the multi-dimensional feature space along alternating axis-aligned hyperplanes to maximize search tree balance; etc.

Once feature correspondences have been computed, a subset of the correspondences can be selected to estimate a transformation of each image of the collection of images that will produce an accurate alignment of the collection of images. Methods used for transformation or mapping estimation can include RANdom Sample Consensus (RANSAC) or least median of squares (LMS) methods. In at least some embodiments, transformation or mapping estimation can be enhanced based on data from the custom calibration profile. For example, the image pixel values in an image, block, or pixel can be affected by noise or distortions such as PRNU. Bias noise compensation images, dark noise compensation images, brightness compensation maps, etc. derived from the custom calibration profile can be applied to normalize images before the featuring matching or transformation/mapping estimation processes to improve the accuracy of such processes. Alternatively, or in addition, other sensor data, such as the gyroscope and accelerometer readings can be used to facilitate image registration. For instance, raw sensor readings from such sensors can be properly filtered based on the custom calibration profile in order to improve the speed and accuracy of the process of registering the image. For example, accelerometer, gyroscope, and geometric calibration data from the camera profile can be used to correlate how an image is relatively situated in the single coordinate system or common grid with respect to other images.

Figure 3:
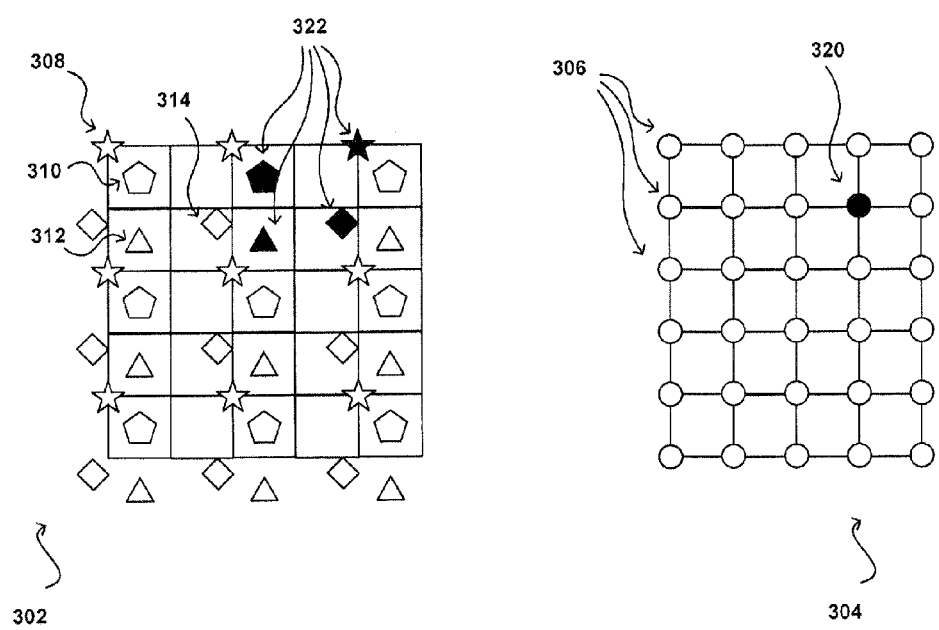
FIG. 3 illustrates an example of an approach for obtaining high quality image data in accordance with various embodiments.

In some embodiments, super-resolution processing may include interpolation of the captured image data to determine a preliminary or interim image corresponding to a higher resolution than the captured image data. FIG. 3 illustrates an example of non-uniform interpolation to generate high-resolution image data that can be used in accordance with various embodiments. In this example, grid 302 represents a portion of a stack of registered images on a non-uniformly spaced sampling grid, wherein each of the registered images is offset with respect to one another. In particular, grid 302 shows portions of four lower resolution images each comprising image pixels 308 (e.g., each star), 310 (e.g., each pentagon) 312 (e.g., each triangle) and 314 (e.g., each diamond), respectively. The "star" lower resolution image comprising image pixels 308 is the reference image situated on the non-uniformly spaced sampling grid 302, and the other lower resolution images are depicted as shifted to various degrees with respect to the "star" lower resolution image. For instance, if the upsampling factor is two, the "pentagon" lower resolution image comprising pixels 310 has a shift that is less than (0.5, 0.5) for the horizontal and vertical directions; the "triangle" lower resolution image comprising pixels 312 has a shift that is less than 0.5 in the horizontal direction and more than 0.5 in the vertical direction; and the "diamond" lower resolution image comprising image pixels 314 has a shift that is less than 0.5 in the horizontal direction and greater than 0.5 in the vertical direction. Grid 304 shows a portion of a preliminary or interim high-resolution image comprising image pixels 306 (e.g., each circle). As used herein, a preliminary or interim high resolution image refers to a composited image that has not been completely post-processed to remove blur, noise, distortions, artifacts, blemishes, etc. In this example, image pixel 320 of the preliminary or interim "circle" high-resolution image may be determined by interpolating and resampling image pixels 322. Although FIG. 3 illustrates one approach for "reconstruction" of the high-resolution image data (nearest neighbors), it will be appreciated that other approaches are used in various embodiments, such as the weighted nearest neighbor method, bilinear interpolation, the generalized multichannel sampling theorem, the Landweber algorithm, the wavelet-based reconstruction algorithm, etc.

Figure 4:
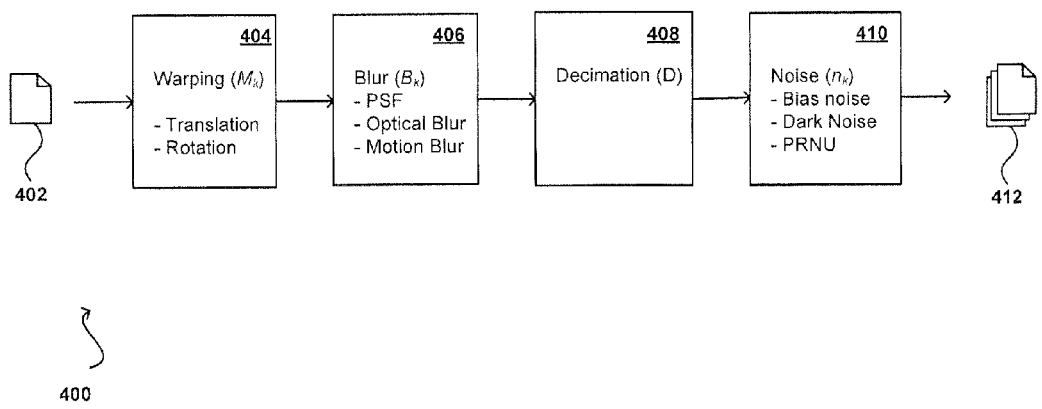
FIG. 4 illustrates an example of an observation model for obtaining high quality image data in accordance with various embodiments.

In various embodiments, super-resolution processing may include image restoration, such as by applying deconvolution algorithms to the coarse image to remove blurring and noise. An observation model that accurately accounts for such degradations in the imaging system can be used as a basis for the iterative optimization of the high-resolution image data. FIG. 4 illustrates an example of a block diagram of an observation model 400 that can be used in accordance with various embodiments. In this example, observation model 400 relates high-resolution image data x 402 to a set of lower resolution images $y_k$ 412. In particular, lower resolution images $y_k$ 412 are related to the high-resolution image data x 402 according to a warping $M_k$ 404, a blurring $B_k$ 406, a decimation factor D 408, and an image noise map $n_k$ 410. Thus, the observation model 400 can be represented as follows:

$$y_k = DB_k M_k x + n_k \text{ for } 1 \le k \le p \quad \text{(Eqn. 3)}$$

where $y_k$ comprises the kth low-resolution image, D comprises the decimation or subsampling operator, $B_k$ comprises the lens and motion blur matrix, $M_k$ comprises the image warping matrix obtained by image registration, x is the high-resolution image data, and $n_k$ is the image noise map obtained by camera calibration. In some embodiments, $n_k$ can be expanded to include the pixel-level brightness compensation maps obtained during device calibration. Image restoration can then be thought of as the inversion of Eqn. 3, and can be expressed as:

$$x = \arg \min \| DB_k M_k x - y_k - n_k \| Q(x) \quad \text{(Eqn. 4)}$$

where x and $B_k$ can be estimated by minimizing the cost function of Eqn. 4 and Q(x) is a smoothness term used to suppress image artifacts and noise. In at least some embodiments, Q(x) may be based upon the $l^1$-norm of the gradient magnitudes of x.

From Eqn. 4, iterative deconvolution can include the computation of the cost function for each image pixel of x to form a cost matrix. The image pixels of x and the camera blur kernel $B_k$ can then be updated by a gradient descent search over the parameter space. Iterative deconvolution can be optimized by applying iterative solvers, such as a conjugate gradient. Conventional approaches for deconvolution may oversimplify the camera blur kernel $B_k$, such as by using a simple Gaussian kernel, and noise characteristics, such as by using an image-level Gaussian function, that may lead to inaccurate results. Approaches in accordance with various embodiments employ more accurate data or a more rigorous model for the camera blur kernel $B_k$ and the noise characteristics based on the custom calibration profile obtained during device calibration. In addition, the pre-calibrated camera related parameters, such as the blur and noise parameters, can be converted into an appropriate form in order to further speed up the iterative optimization process. For example, deconvolution processes can be optimized by performing calculations in the frequency image domain (after Fourier transform). Therefore the blur matrices and noise matrices can be transformed into the frequency domain for different possible image sizes, before the optimization process starts.

Figure 5:
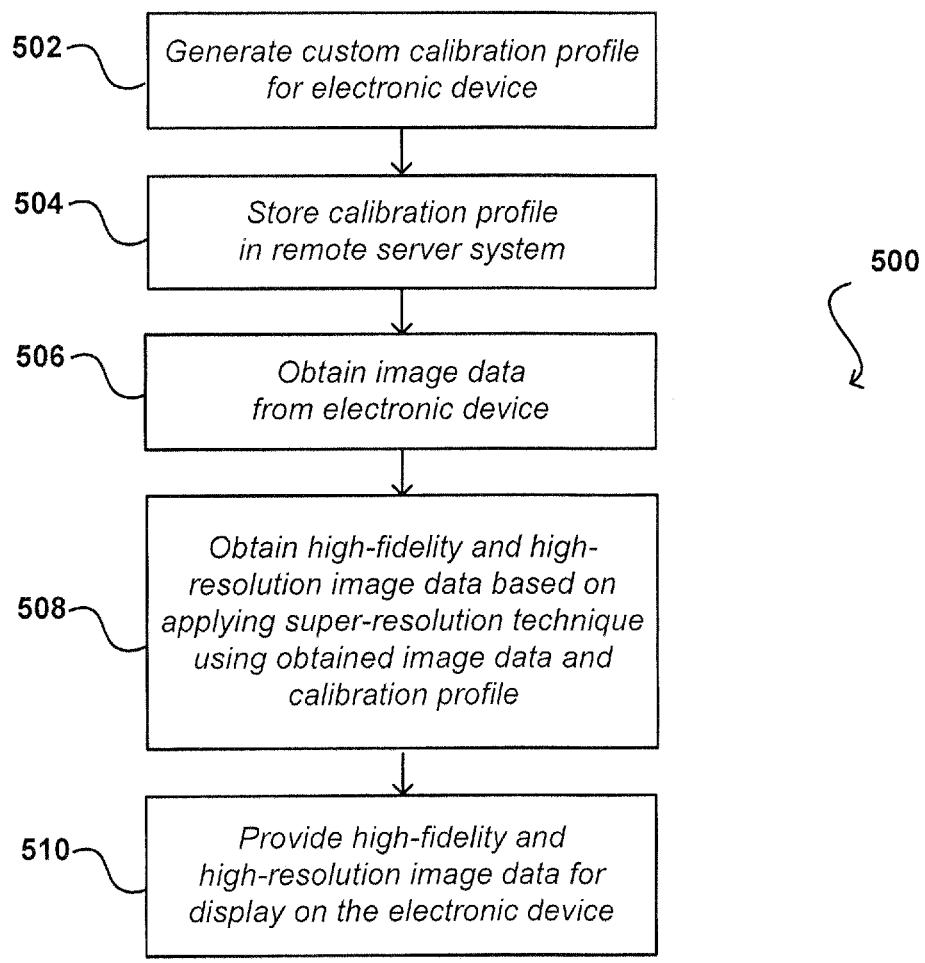
FIG. 5 illustrates an example process for obtaining high-quality image data in accordance with an embodiment.

FIG. 5 illustrates an example process 500 for acquiring high-fidelity and high-resolution image data that can be used in accordance with various embodiments. It should be understood that, for any process discussed herein, there can be additional, fewer, or alternative steps performed in similar or alternative orders, or in parallel, within the scope of the various embodiments unless otherwise stated. In this example, the process is initiated by generating a custom calibration profile for an electronic device 502. As discussed elsewhere herein, the custom calibration profile can be obtained by estimating various characteristics of a camera (e.g., noise, geometric distortion, radiometric distortion, lens blur, etc.) and other sensors of the electronic device (e.g., position and orientation offsets of inertial sensors, sensitivity and stability of inertial sensors, temperature offsets of a thermometer, etc.). The custom calibration profile for the electronic device can be stored at a remote server system 504, wherein the calibration profile will be associated with that particular electronic device. Alternatively, or in addition, the calibration profile can be stored on the electronic device. The electronic device can then be used to obtain raw image data 506. The raw image data may comprise image data corresponding to the highest resolution capable of being captured by the electronic device image data corresponding to a coarser resolution. The raw image data can be sent to the remote server, wherein the raw image data may be processed using a super-resolution algorithm and data derived from the custom calibration profile to obtain high-fidelity and high-resolution image data 508. As discussed elsewhere herein, super-resolution processing can also occur on the electronic device in at least some embodiments. The high-fidelity high-resolution image data can then be provided for display on the electronic device 510.

Figure 6:
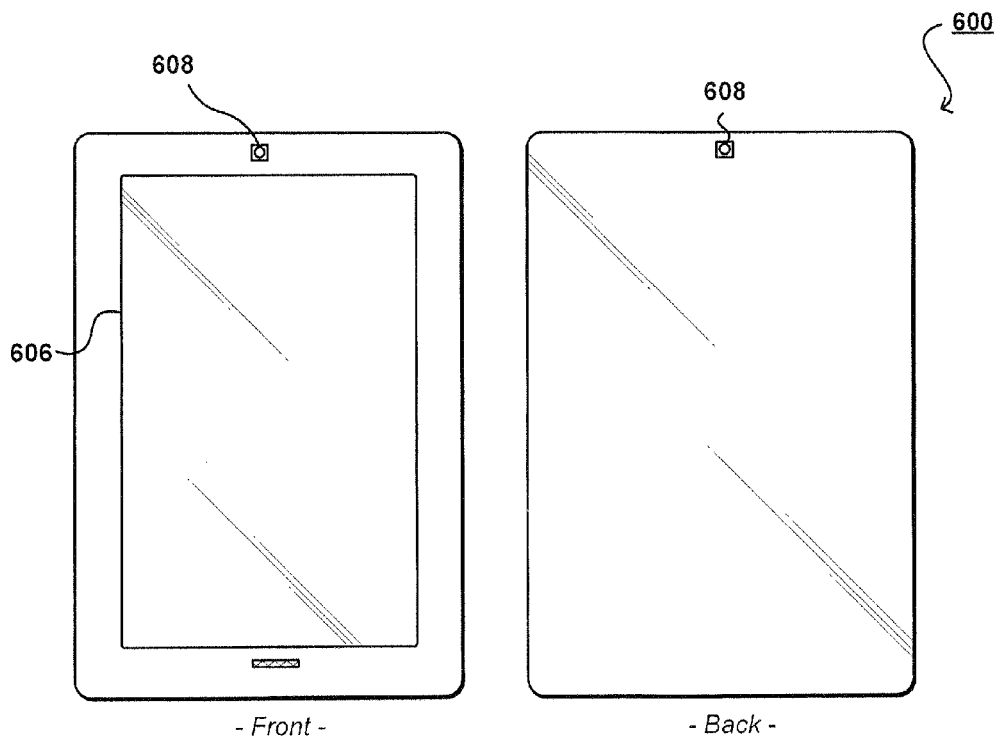
FIG. 6 illustrates an example of a computing device that can be used in accordance with various embodiments.

FIG. 6 illustrates an example computing device 600 that can be used to perform approaches described in accordance with various embodiments. In this example, the device has conventional cameras 608 on each of a same and opposite side of the device as a display element 606 that enable the device to capture image data in accordance with various embodiments. Each of the cameras 608 may include at least some of the components of the digital image sensor illustrated in FIG. 1, such as the optical system 102, the color filter array 112, and the matrix of pixels 108.

Figure 7:
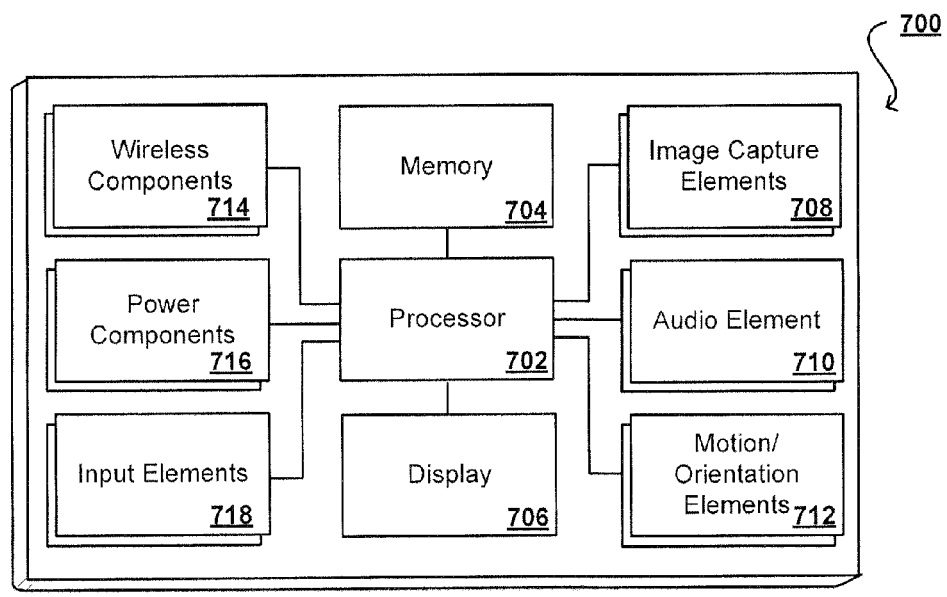
FIG. 7 illustrates an example configuration of components of a computing device such as that illustrated in FIG. 6.

In order to provide various functionality described herein, FIG. 7 illustrates an example set of basic components of a computing device 700, such as the device 600 described with respect to FIG. 6. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed above, the device in many embodiments will include one or more image capture elements 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element can include, or be based at least in part upon any appropriate technology, such as a CCD or CMOS image capture element having a sufficient resolution, focal range, viewable area, to capture an image of the user when the user is operating the device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 712 that provide information such as a position, direction, motion, or orientation of the device. These one or more motion and/or orientation determining elements 712 can include, for example, accelerometers, inertial sensors, electronic gyroscopes, electronic compasses, and GPS elements.

The example device can also include one or more additional input devices 718 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
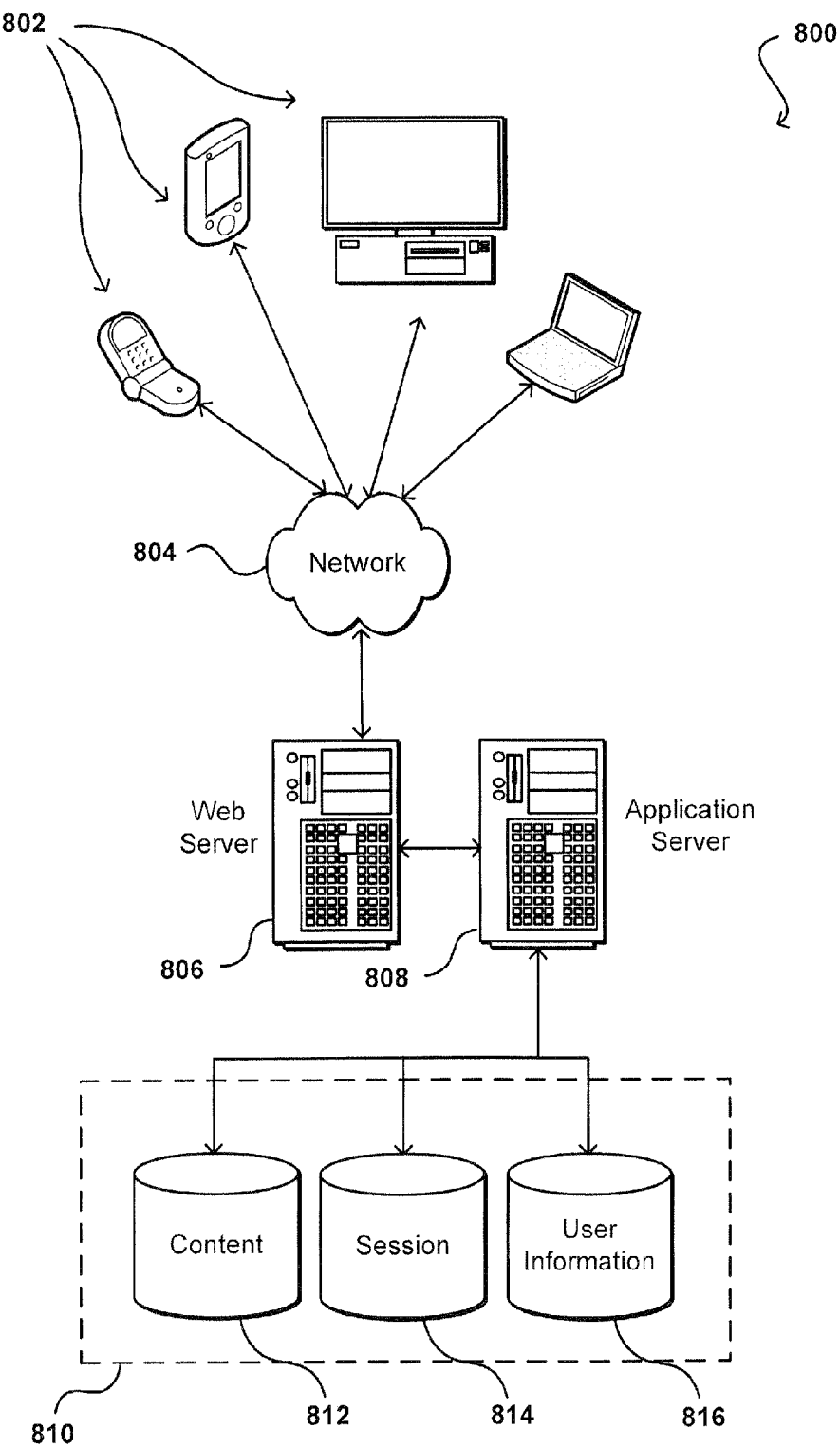
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for generating high-fidelity and high-resolution image data, comprising:
   under control of one or more computer systems configured with executable instructions,
      obtaining a calibration profile for a camera of an electronic device, the calibration profile including at least a brightness compensation map;
      capturing first image data using the camera;
      receiving a request from the electronic device to process the first image data to generate second image data, the first image data corresponding to a first image resolution and a first level of fidelity, the first image resolution being lower than a second image resolution corresponding to the second image data to be generated, the first level of fidelity lower than a second level of fidelity corresponding to the second image data;
      applying the brightness compensation map to at least one image of the first image data to generate normalized image data;
      executing a super-resolution process, using the normalized image data, to generate the second image data; and
      sending the second image data to the electronic device in response to the request.

2. The computer-implemented method of claim 1, wherein executing the super-resolution process includes:
   registering each image of the normalized image data to generate registered image data, the registered image data including a respective transformation of each image of the normalized image data, the respective transformation of each image aligning the image to a first grid;
   generating third image data comprising a plurality of pixels corresponding to a second grid, the second grid corresponding to the second image resolution of the second image data, each pixel of the third image data interpolated from one or more pixels located at a respective position of the first grid; and
   generating the second image data by applying one or more deconvolution processes to the third image data to remove at least one of blur or noise.

3. The computer-implemented method of claim 1, wherein the calibration profile further comprises at least one of:
   geometric calibration data;
   radiometric calibration data;
   one or more measurements corresponding to noise;
   one or more noise compensation images;
   one or more measurements corresponding to lens blur;
   a point spread function;
   a defective pixel mask; or
   one or more measurements corresponding to at least one sensor, other than the camera, of the electronic device.

4. The computer-implemented method of claim 1, further comprising:
   obtaining image metadata corresponding to the first image data; and
   obtaining sensor data corresponding to the first image data, the sensor data obtained from at least one of a digital compass, an accelerometer, a gyroscope, a magnetometer, a depth sensor, a proximity sensor, a light sensor, a motion detector, a microphone, GPS, a geolocation sensor, a touch sensor, a thermometer, an altimeter, or a barometer of the electronic device, wherein the super-resolution process further uses at least a portion of the image metadata and at least a portion of the sensor data to generate the second image data.

5. A computer-implemented method for generating high-resolution image data, comprising:

under control of one or more computer systems configured with executable instructions, obtaining calibration data for a camera, the calibration data including at least a brightness compensation map;

capturing first image data using the camera;

receiving a request to process the first image data to generate second image data, the first image data corresponding to a first resolution that is lower than a second resolution of the second image data;

applying the brightness compensation map to at least one image of the first image data to generate normalized image data; and executing a super-resolution process, using the normalized image data, to generate the second image data.

6. The computer-implemented method of claim 5, wherein executing the super-resolution process includes:

registering each image of the normalized image data to generate registered image data, the registered image data including a respective transformation of each image of the normalized image data, the respective transformation of each image aligning the image to a first grid;

generating third image data comprising a plurality of pixels corresponding to a second grid, the second grid corresponding to the second resolution of the second image data, each pixel of the third image data interpolated from one or more pixels located at a respective position of the first grid; and generating the second image data by applying one or more deconvolution processes to the third image data to remove at least one of blur or noise.

7. The computer-implemented method of claim 5, wherein the calibration data for the camera further comprises at least one of:

geometric calibration data;
radiometric calibration data;
one or more measurements corresponding to noise;
one or more noise compensation images;
one or more measurements corresponding to lens blur;
a point spread function; or
a defective pixel mask.

8. The computer-implemented method of claim 6, wherein the calibration data includes a defective pixel map and registering each image of the at least a portion of the first image data includes:

determining one or more false positive features of the image, the one or more false positive features corresponding to the defective pixel map; and removing the one or more false positive features from consideration as a feature of the image.

9. The computer-implemented method of claim 6, wherein the calibration data further includes one or more noise compensation images and registering each image of the normalized image data includes:

applying the one or more noise compensation images for estimation of the respective transformation of each image.

10. The computer-implemented method of claim 6, further comprising:

obtaining image metadata corresponding to the first image data, wherein the super-resolution process further uses at least a portion of the image metadata to generate the second image data.

11. The computer-implemented method of claim 6, further comprising:

obtaining sensor data corresponding to the first image data, the sensor data obtained from at least one of a digital compass, an accelerometer, a gyroscope, a magnetometer, a depth sensor, a proximity sensor, a light sensor, a motion detector, a microphone, GPS, a geolocation sensor, a touch sensor, a thermometer, an altimeter, or a barometer, wherein the super-resolution process further uses at least a portion of the sensor data to generate the second image data.

12. The computer-implemented method of claim 6, wherein to remove the at least one of blur or noise includes at least one of:

applying one or more bias noise compensation images;
applying one or more dark noise compensation images;
applying one or more noise compensation images;
applying a brightness compensation map; or
applying a defective pixel mask.

13. The computer-implemented method of claim 6, wherein applying the one or more deconvolution processes includes:

computing a cost function for each image pixel of the second image data to generate a cost matrix; and updating image pixels of the second image data and a camera blur kernel by a gradient descent search over parameter space.

14. The computer-implemented method of claim 5, wherein the first image data corresponds to a first level of fidelity that is lower than a second level of fidelity corresponding to the second image data to be generated.

15. An electronic device, comprising:

a processor;
a display component;
a camera;
memory including instructions that, when executed by the processor, cause the electronic device to:

obtain calibration data for the camera, the calibration data including at least a brightness compensation map;

capture first image data using the camera;

apply the brightness compensation map to at least one image of the first image data to generate normalized image data;

cause the normalized image data to be processed to generate second image data, the normalized image data corresponding to a first resolution that is lower than a second resolution corresponding to the second image data;

display the second image data on the display component, the second image generated by execution of a super-resolution process using the normalized image data.

16. The electronic device of claim 15, wherein the instructions when executed further cause the electronic device to:

capture image metadata corresponding to the first image data; and capture sensor data corresponding to the first image data, the sensor data captured from at least one of a digital compass, an accelerometer, a gyroscope, a magnetometer, a depth sensor, a proximity sensor, a light sensor, a motion detector, a microphone, GPS, a geolocation sensor, a touch sensor, a thermometer, an altimeter, or a barometer, wherein the super-resolution process further uses at least a portion of the image metadata and at least some of the sensor data to generate the second image data.

17. The electronic device of claim 15, wherein execution of the super-resolution process includes:

registering each image of the normalized image data to generate registered image data, the registered image data including a respective transformation of each image of the normalized image data, the respective transformation of each image aligning the image to a first grid;

generating third image data comprising a plurality of pixels corresponding to a second grid, the second grid corresponding to the second resolution of the second image data, each pixel of the third image data interpolated from one or more pixels located at a respective position of the first grid; and generating the second image data by applying one or more deconvolution processes to the third image data to remove at least one of blur or noise.

18. The electronic device of claim 17, wherein the calibration data includes a defective pixel map and the instructions for registering each image of the normalized image data include causing the electronic device to perform:

determining one or more false positive features of the image, the one or more false positive features corresponding to the defective pixel map; and removing the one or more false positive features from consideration as a feature of the image.

19. The electronic device of claim 17, wherein the calibration data includes one or more noise compensation images and the instructions for registering each image of the normalized image data include causing the electronic device to:

apply the one or more noise compensation images for estimation of the respective transformation of each image.

20. The electronic device of claim 17, wherein to remove the at least one of blur or noise includes at least one of:

applying one or more bias noise compensation images;
applying one or more dark noise compensation images;
applying one or more noise compensation images;
applying a brightness compensation map;
a defective pixel mask.

21. The electronic device of claim 17, wherein applying the one or more deconvolution processes includes:

computing a cost function for each image pixel of the second image data to generate a cost matrix; and updating image pixels of the second image data and a camera blur kernel by a gradient descent search over parameter space.

22. The electronic device of claim 15, wherein the instructions, to cause the normalized image data to be processed to generate the second image data include causing the electronic device to:

send a request to a remote server system to process the normalized image data to generate the second image data, wherein the second image data is received from the remote server system, and execution of the super-resolution process occurs at the remote server system.

* * * * *